United States Patent [19]
Nakatani et al.

[11] Patent Number: 5,253,079
[45] Date of Patent: Oct. 12, 1993

[54] FACSIMILE APPARATUS HAVING IMPROVED ERROR CHECK FUNCTION OF RECEPTION DATA

[75] Inventors: Munehiro Nakatani, Toyokawa; Shigenobu Fukushima, Yao, both of Japan; Toshio Tsuboi, N.J.

[73] Assignee: Minolta Camera Kabushiki Kaisha, Osaka, Japan

[21] Appl. No.: 740,448

[22] Filed: Aug. 5, 1991

[30] Foreign Application Priority Data

Aug. 8, 1990 [JP] Japan ............................ 2-210735

[51] Int. Cl.[5] ............................................ H04N 1/417
[52] U.S. Cl. .................................... 358/426; 358/427
[58] Field of Search .......................... 358/426–427, 358/261.1–261.4, 434; 382/56

[56] References Cited

U.S. PATENT DOCUMENTS

| | | | |
|---|---|---|---|
| 4,903,317 | 2/1990 | Nishihara et al. | 358/426 |
| 4,992,889 | 2/1991 | Yamagami et al. | 358/426 |
| 5,031,053 | 7/1991 | Chamzas et al. | 358/426 |
| 5,177,797 | 1/1993 | Takenaka et al. | 358/426 |

FOREIGN PATENT DOCUMENTS 63-80676  4/1988  Japan .

Primary Examiner—Stephen Brinich
Attorney, Agent, or Firm—Willian Brinks Olds Hofer Gilson & Lione

[57] ABSTRACT

A facsimile apparatus according to the present invention includes a receiver for receiving a code data transmitted by another facsimile apparatus, a memory for storing code data received by the receiver, a predecoder for decoding code data received by the receiver sequentially into image data, a detecting device checking the image data decoded by the predecoder for detecting the presence of reception error, a transmitter for transmitting a signal indicating the detected result of the detecting device to another facsimile apparatus, a redecoder for decoding again code data stored in the memory into image data after a signal is transmitted from the transmitter, and an image forming apparatus for forming an image on a paper sheet according to the image data decoded by the redecoder.

10 Claims, 10 Drawing Sheets

FACSIMILE APPARATUS HAVING IMPROVED ERROR CHECK FUNCTION OF RECEPTION DATA

BACKGROUND OF THE INVENTION

1. Field of the Invention

The present invention relates to a facsimile apparatus, and more particularly to a facsimile apparatus capable of error checking in memory reception.

2. Description of the Related Art

A facsimile apparatus capable of memory reception is widely used. The facsimile apparatus temporarily stores the received data in a memory, whereby printing is carried out on a paper sheet by reading out and expanding the data in the memory after at least one page of data is received.

Such a facsimile apparatus carries out only the operation of transferring the reception data to a memory at the time of reception. A check whether there is error in the reception data was not made.

Error in reception data was found out by expanding the reception data in recording the reception data stored in the memory on a paper sheet.

Even if there was error in the reception data and the picture quality was defective, that error in data was not detected at the time of reception to send a signal indicating the error to the sending party (the transmitting side). The sending party could not be made aware of error in the transmission data to take measures such as resending the page of defective picture quality.

SUMMARY OF THE INVENTION

An object of the present invention is to improve reliability in a facsimile apparatus.

Another object of the present invention is to promptly detect reliability of reception data in a facsimile apparatus capable of memory reception.

A further object of the present invention is to promptly notify defect in reception data to the transmitting party in a facsimile apparatus capable of memory reception.

The above objects are attained by providing a facsimile apparatus according to an aspect of the present invention, including a receiving apparatus for receiving compressed image data transmitted from another facsimile apparatus; a memory for storing a plurality of pages of compressed image data received by the receiving apparatus; a first expanding device for expanding the stored compressed image data, after the memory device has completed storing the plurality of pages of compressed image data; an image formation apparatus for forming image on a paper sheet according to the image data expanded by the first expanding device; and a second expanding device for expanding compressed image data before expansion by the first expanding device.

The facsimile apparatus of the above-described structure expands compressed image data before expansion by the first expanding device, allowing confirmation of the contents of the reception data before image formation.

The foregoing objects are attained by providing a facsimile apparatus according to another aspect of the present invention, including a receiving apparatus for receiving compressed image data transmitted from another facsimile apparatus; a memory for storing a plurality of pages of compressed image data received by the receiving apparatus; a first expanding device for expanding the stored compressed image data, after the memory has completed storage of a plurality of pages of compressed image data; an image formation apparatus for forming image on a paper sheet according to the image data expanded by the first expanding device; a second expanding device for expanding compressed image data in parallel with the storing operation of compressed image data by the memory; and a detecting device for detecting whether image data is received properly or not according to image data expanded by the second expanding device.

The facsimile apparatus of the above described structure expands compressed image data in parallel with the storing operation of the received compressed image data to detect whether the reception is proper or not, resulting in prompt confirmation of reliability of the reception data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be explained hereinafter with reference to the drawings.

Figure 3:
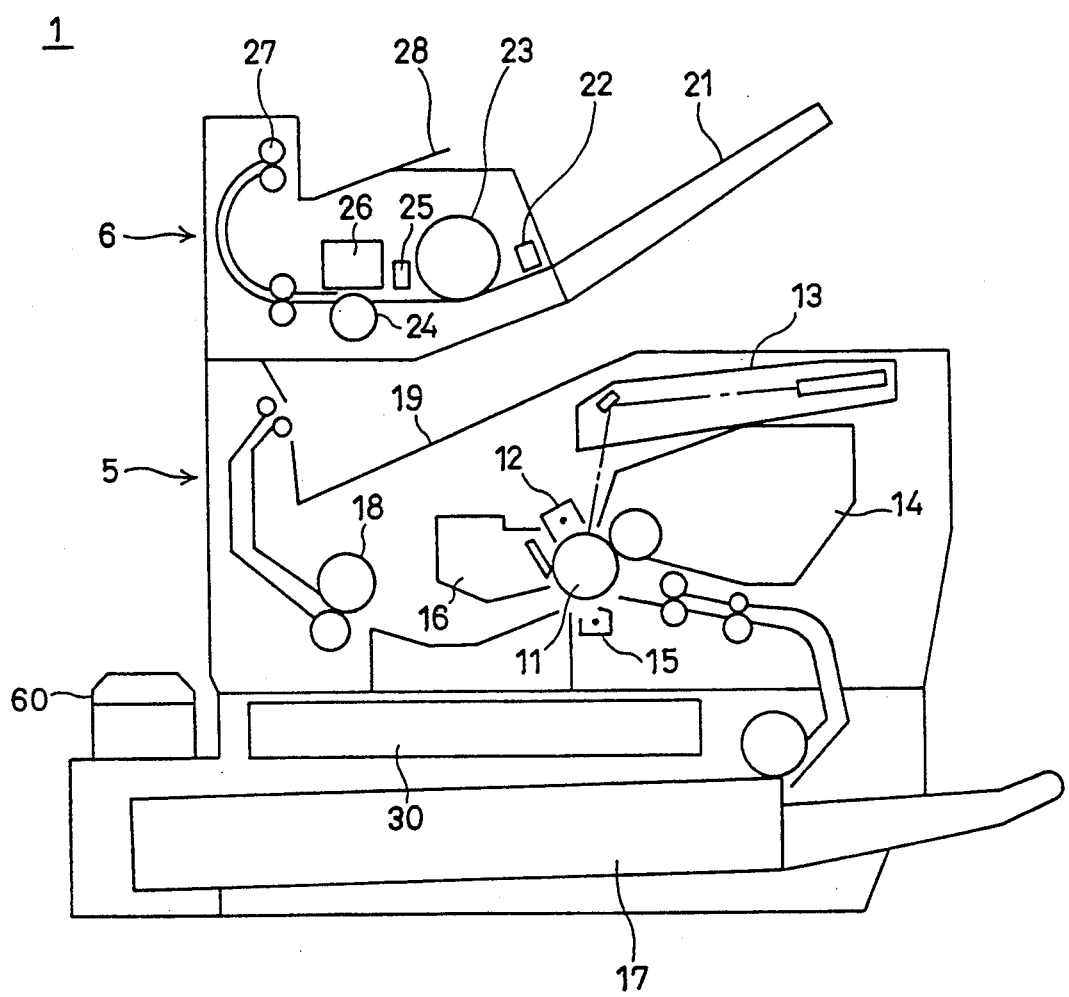
FIG. 3 is a sectional view showing the structure of the facsimile apparatus according to the first embodiment of the present invention.

FIG. 3 is a sectional view of a facsimile apparatus according to the present invention.

A facsimile apparatus 1 comprises a recording portion 5 formed of a laser beam printer, and a reading portion 6 provided above recording portion 5.

The structure and operation of recording portion 5 will be described schematically.

The photoreceptor on a photoreceptor drum 11 rotatably driven by a motor (not shown) is charged in uniform by a charger 12, and then irradiated with a laser beam by an optical system 13 according to image data, resulting in the formation of an electrostatic latent image on the photoreceptor. Toner of a developing unit 14 is attached to this electrostatic latent image and then developed.

A paper-feed cassette 17 is provided with cut paper. The loaded cut paper is conveyed to photoreceptor drum 11 by a roller and the like one at a time.

Toner attached to photoreceptor drum 11 is transferred to the cut paper by a transfer charger 15 and then fixed by a fixing unit 18. The cut paper is discharged to a tray 19. The toner not transferred is collected by a cleaner 19. This completes one print operation.

The structure and operation of reading portion 6 will be described schematically hereinafter.

An original placed upon an original tray 21 is detected by a sensor 22 to be conveyed to the position of a sensor 25 by a roller 23 one sheet at a time. The original is forwarded by the rotation of a roller 24 driven by a motor not shown. This original is read by a linear image sensor 26 in synchronization. The read original image is converted into digital image data by a communication controller 30. The read original is discharged to a discharge portion 28 by a discharge roller 27.

Figure 1:
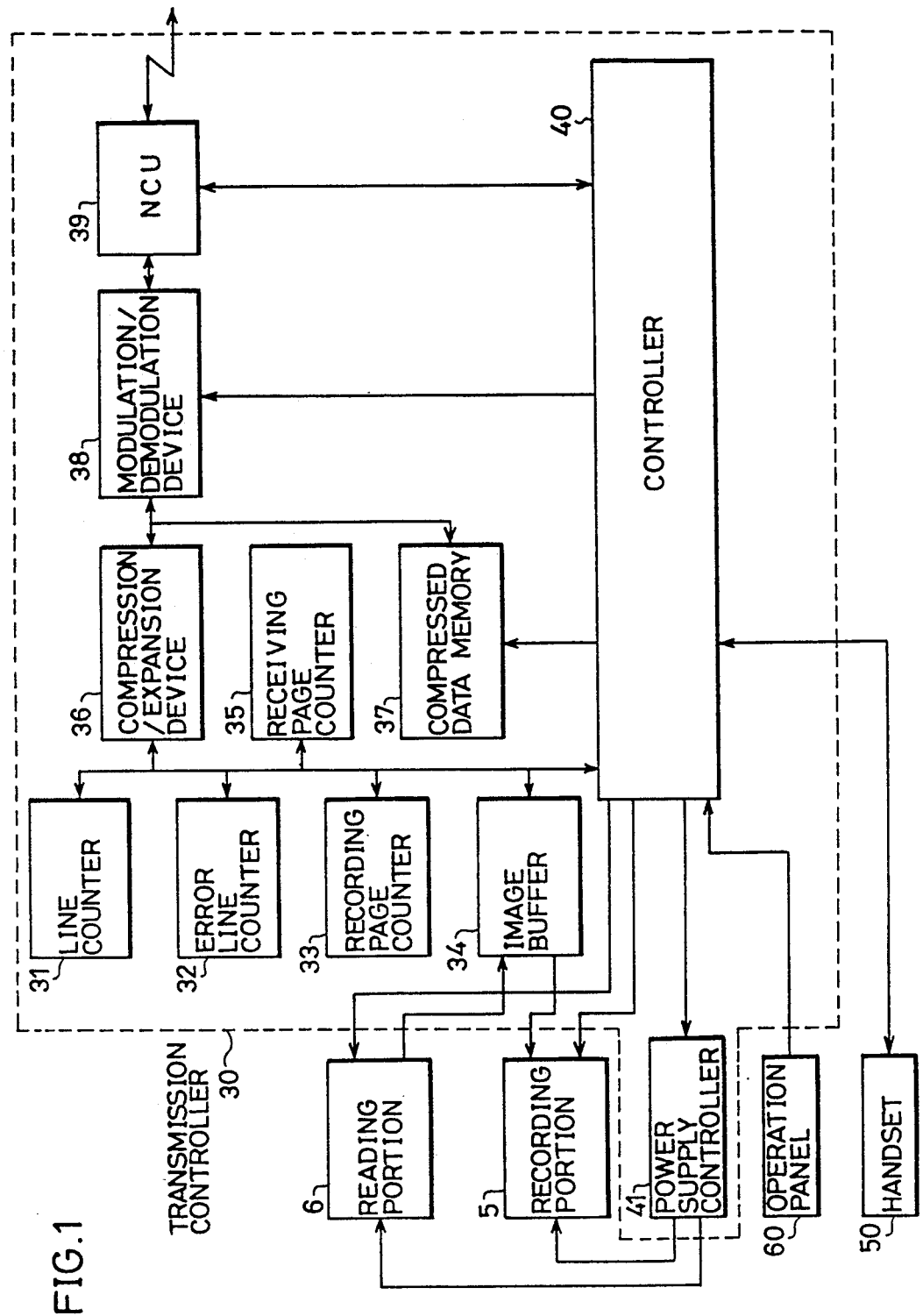
FIG. 1 is a block diagram showing the electrical structure of a facsimile apparatus according to an embodiment of the present invention.

FIG. 1 is a block diagram of the electrical structure of facsimile apparatus 1 according to the present invention.

In addition to the above-described recording portion 5, reading portion 6, and communication controller 30, facsimile apparatus 1 is provided with a handset 50 for conversation, and an operation panel 60 to specify operation.

Communication controller 30 comprises a line counter 31, an error line counter 32, a recording page counter 33, an image buffer 34, a receiving page counter 35, a compression/expansion device 36, a compressed data memory 37, a modulation/demodulation device 38, a NCU 39, a controller 40, and a power supply controller 41.

Line counter 31 counts the number of lines of proper lines without error when the expansion process of the reception data is carried out.

Error line counter 32 counts the number of lines that include error. When the count value of error line counter 32 reaches a predetermined number, or a predetermined rate with respect to the number of lines of one page, determination is made that the page is not received properly. Then, the reception data of that page is abandoned, and a response signal "RTN" is sent to the transmission side, for example.

Recording page counter 33 counts the number of pages in recording at recording portion 5. Recording page counter 33 is incremented by 1 when line counter 31 counts a predetermined number.

Image buffer 34 is a memory that can store image data of several lines to one page of an original. Recording portion 5 and reading portion 6 share image buffer 34.

Receiving page counter 35 counts a page signal sent from the transmission side at the time of reception.

Compression/expansion device 36 expands the received compressed data to data of the actual image by a predetermined code algorithm, or compresses the image data for transmission. The expansion process of compression/expansion device 36 comprises a first expansion process for making determination whether there is error in reception data, and a second expansion process for recording data on a paper sheet.

Compressed data memory 37 is a memory having a capacity of approximately 30 pages, for example, for storing the received compressed data (reception data) and the data (transmission data) compressed for transmitting image data. At the time of reception, recording by recording portion 5 is not carried out immediately. Reception data demodulated by modulation/demodulation device 38 is temporarily stored in compressed data memory 37. After all the reception data is received, or after reception data of at least one page is received, recording by recording portion 5 is carried out in parallel with the reception operation. This is called memory reception. When reception data previously received, or a management report is being recorded, reception data is stored in an empty region in compressed data memory 37.

Facsimile apparatus 1 of the present embodiment is capable of transmission interrupt during recording to interrupt the recording by the operation of an operator to then carry out transmission process. When this transmission interrupt is carried out, transmission data is stored in the empty region in compressed data memory 37 while the reception data not yet processed is still held in compressed data memory 37. This means that compressed data memory 37 may include mixed regions of reception data and transmission data. By storing transmission data in compressed data memory 37, transmission of data at a predetermined date of time, i.e., the so-called timer transmission, can be carried out.

Controller 40 controls the entire facsimile apparatus 1 such as recording portion 5, reading portion 6, communication controller 30, handset 50, operation panel 60, etc.

In controller 40, error in reception data is checked for each line. This check is carried out depending on whether the number of dots of one line expanded is a standard number (for example, 1728 dots for A4 size). A line is determined to be an error line if the number of dots is not the standard number. When the number of error lines in one page reaches a predetermined number (for example, 10% of lines for one page), determination is made that the page includes transmission error. When determination is made of transmission error, a response signal regarding the transmission of that page is transmitted to the sending party (the transmission side), after the transmission of that page is completed.

Controller 40 is realized for example, by a MPU programmed appropriately.

Power supply controller 41 supplies power to recording portion 5, reading portion 6 and communication controller 30, as well as controlling the supply of power.

Figure 2:
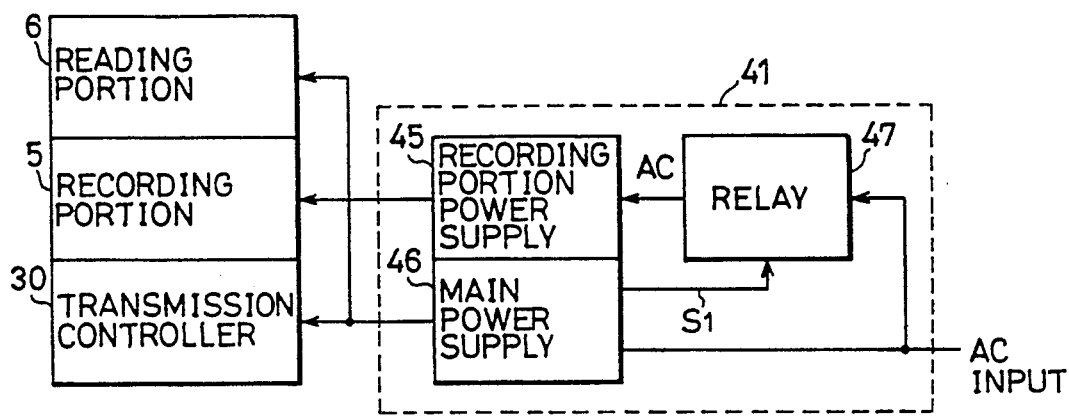
FIG. 2 is a block diagram showing the structure of a power supply controller of FIG. 1 and the power supply system.

FIG. 2 is a block diagram of the structure of power supply controller 41 of FIG. 1 and the power supply system.

Power supply controller 41 comprises recording portion power supply 45 for supplying power to recording portion 5, main power supply 46 for supplying power to reading portion 6 and to communication controller 30, and a relay 47 for turning on/off the AC input of recording portion power supply 45.

Main power supply 46 is always actuated when the power supply switch of the main (not shown) is turned on in facsimile apparatus 1 so that power is constantly supplied to reading portion 6 and communication controller 30.

Recording portion supply 45 actuates only when recording portion 5 operates. At the reception standby state, AC input to recording portion power supply 45 is cut off by relay 47, so that supply of power to recording portion 5 is suppressed during this state (power saving mode). When communication from an external source is received and confirmation is made that reception data of one page is proper by communication controller 30, relay 47 is switched by a power supply control signal S1 to apply AC input to recording portion power supply 45. A predetermined amount of power begins to be supplied to recording portion 5, so that recording portion 5 attains an operable state (normal mode).

The operation of facsimile apparatus 1 will be explained in further detail according to the flow charts of FIGS. 4–8.

The facsimile procedures in the flow charts are based on CCITT Recommendation T30.

Figure 4:
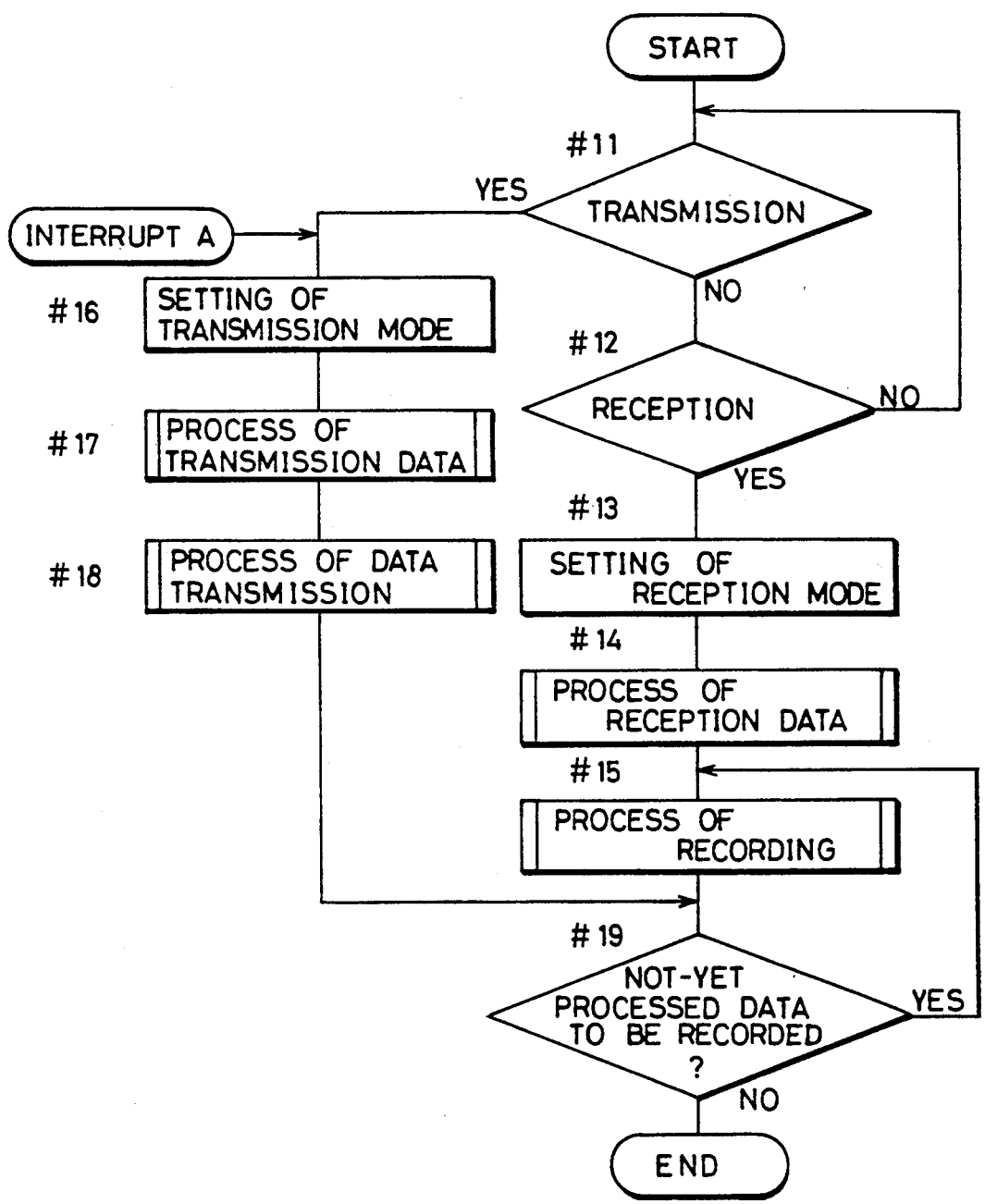
FIG. 4 is a flow chart showing the main routine of the control operation by the controller of FIG. 1.

FIG. 4 is a flow chart of the main operation of facsimile apparatus 1.

At steps #11 and #12, the start of transmission or reception operation is always monitored. During this state, facsimile apparatus 1 is always capable of reception, i.e. is at a reception standby state.

When a reception signal from NCU 39 is received at the reception standby state (YES at step #12), controller 40 sets the reception mode such as the communication speed, density, and paper size by a predetermined preliminary procedure (step #13), carries out the process of reception data (step #14), and then carries out the recording process by recording portion 5 (step #15).

When transmission operation is actuated by an entry from operation panel 60 or by an original being set (YES in step #11), controller 40 sets the transmission mode such as the resolution and density according to information from operation panel 60 (step #16), carries out the process of transmission data (step #17), and carries out the process of data transmission (step #18).

When there is data not yet processed that should be recorded (YES in step #19), recording portion power supply 45 is turned on to start the supply of power to recording portion 5 (step #20), and the recording process of step #15 is carried out. The process is terminated when all the recording process is completed.

The process starts from step #16 and #13 in case of transmission interrupt and reception interrupt, respectively.

Figure 5:
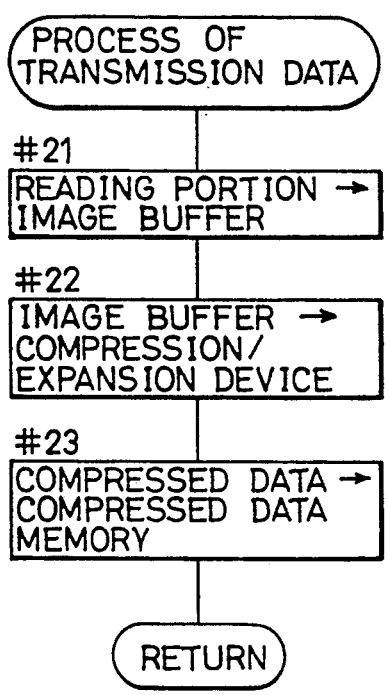
FIG. 5 is a flow chart showing the specific contents of the routine of the process of transmission data of FIG. 4.

FIG. 5 is a flow chart showing the specific contents of the process of transmission data of step #17.

Image data read and binary coded by reading portion 6 is stored in image buffer 34 (step #21). The image data stored in image buffer 34 is transferred to compression-/expansion device 36, where data is compressed according to a predetermined compression system (MH system, MR system, etc.) in step #22. The compressed data is stored in compressed data memory 37 (step #23).

Figure 6:
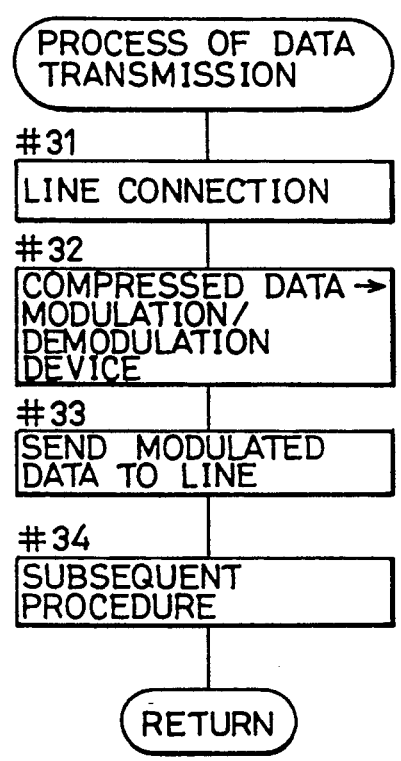
FIG. 6 is a flow chart showing the specific contents of the routine of the process of data transmission of FIG. 4.

FIG. 6 is a flow chart showing the specific contents of the data transmission process of step #18.

Line connection to the destinated transmission party is carried out by the dialed information from operation panel 60 (step #31). Then, a predetermined facsimile procedure is carried out.

After the predetermined preliminary procedure is carried out, compressed data is read out from compressed data memory 37 to be modulated by modulation/demodulation device 38 (step #32). The modulated signal is transmitted from NCU 39 to the line (step #33). After transmission of data of one communication is completed, the transmission operation is terminated by a predetermined subsequent procedure (step #34).

Figure 7A:
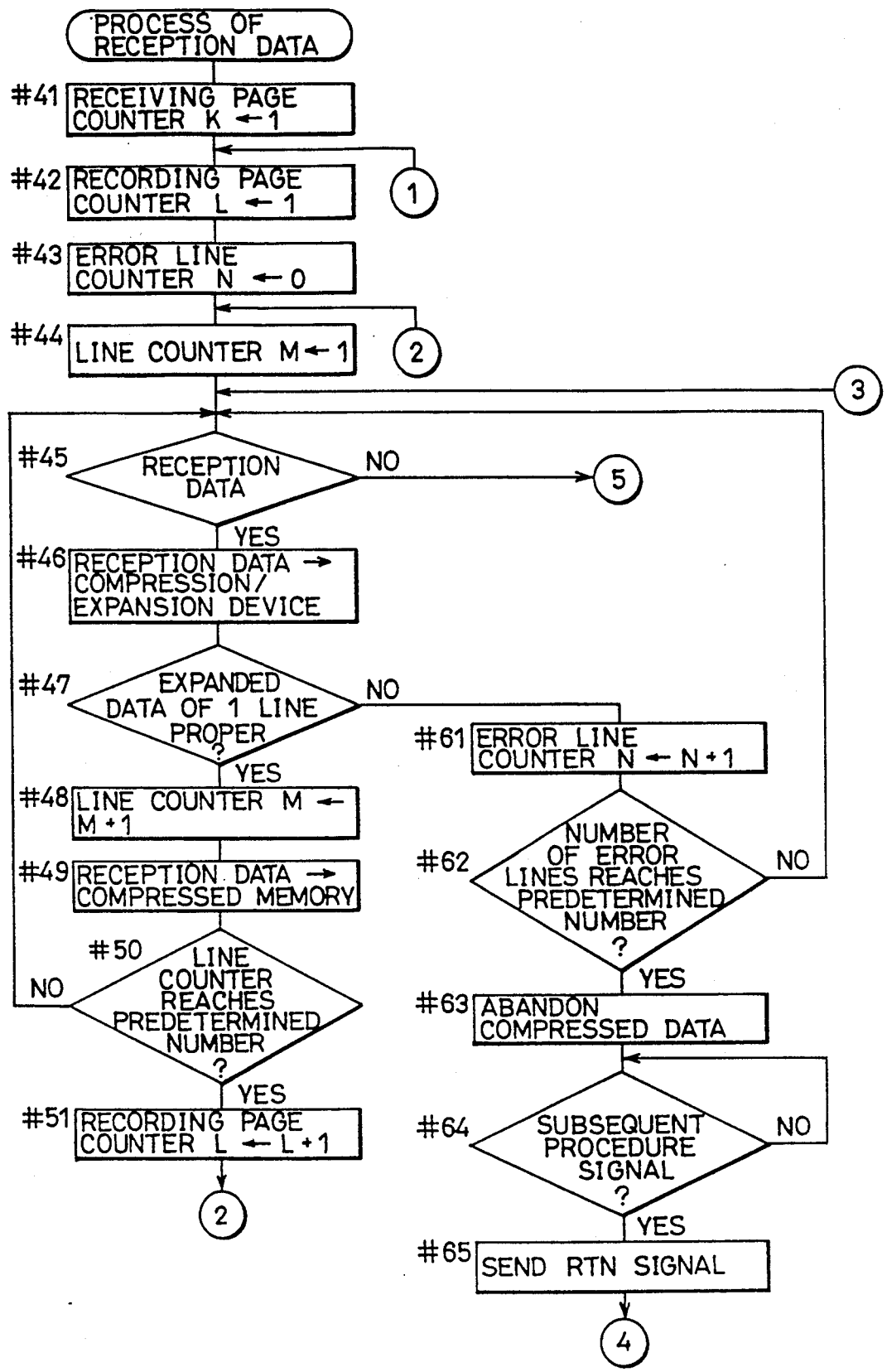
FIGS. 7A and 7B are flow charts showing the specific contents of the routine of the process of reception data of FIG. 4.
Figure 7B:
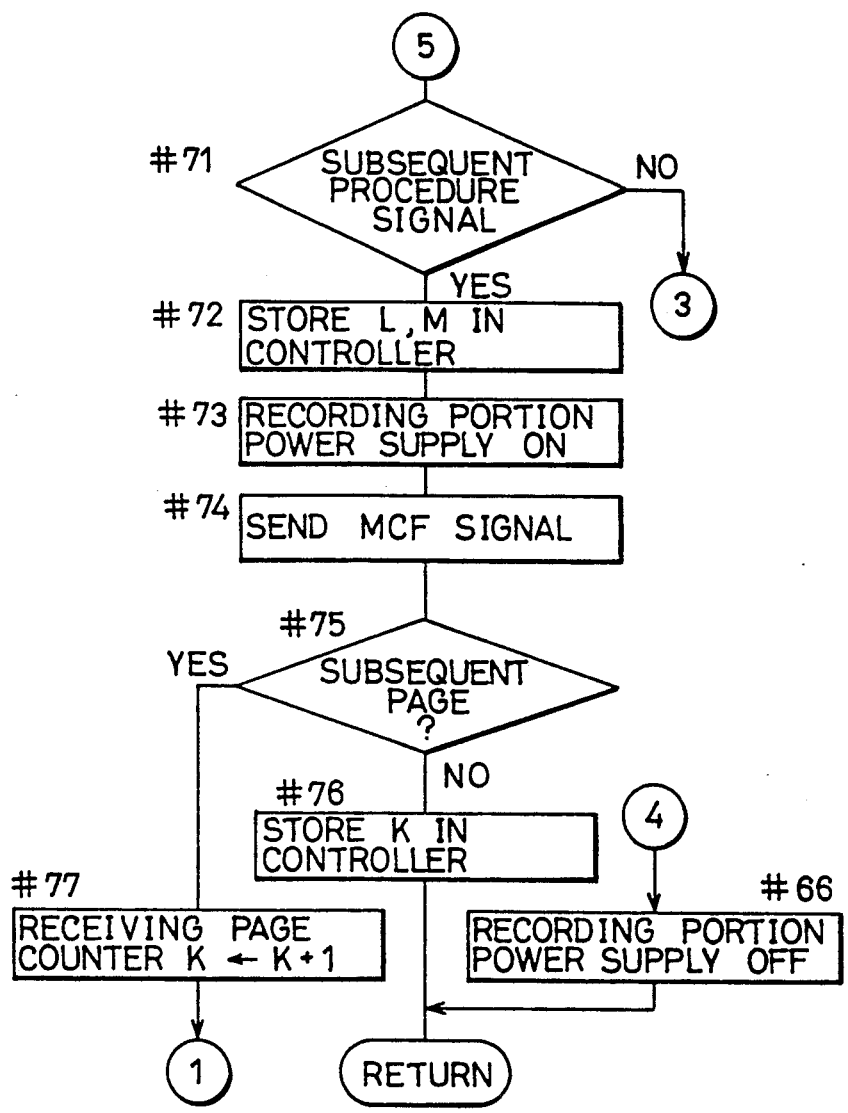

FIGS. 7A and 7B are flow charts showing the specific contents of the reception data process of step #14.

According to these flow charts, presence of error in the reception data is checked. After confirmation is made that data of one page sent from the calling party (transmission side) is received properly, supply of power to recording portion 5 is commenced.

First, initialization is carried out for receiving page counter 35, recording page counter 33, error line counter 32, and line counter 31 (steps #41–44).

At the time of reception, all the reception data is temporarily stored in compressed data memory 37. Therefore, a determination is first made whether there is reception data in compressed data memory 37 (step #45). Because the presence of reception data of the same one page (one page of the transmission side) is checked at step #45, the result of determination in this step becomes NO when the process of 1 page is completed.

When there is reception data, the data is sent to compression/expansion device 36 where expansion process is carried out (step #46).

Simultaneously with this expansion process, the number of dots for 1 line of the expanded data is checked by controller 40 to determine whether there is line error or not (step #47).

If there is error in the reception data, the number of dots of 1 line of the expanded data will not indicate a predetermined number. This result is used for the determination of the presence of error in the relevant line.

When the data is proper (YES at step #47), line counter 31 is incremented by 1 (step #48). The reception data corresponding to that line is held in compressed data memory 37 (step #49).

Steps #45 and et seq are repeated until the count value of line counter 31 reaches a predetermined value. When the count value becomes a predetermined value (YES at step #50), recording page counter 33 is incremented by 1 (step #51). Control proceeds to step #44, whereby the above-described procedures are repeated until the check of reception data of that 1 page is completed.

When determination is made at step #47 of an error line, error line counter 32 is incremented (step #61). The reception data corresponding to that line is abandoned. If the count value of error counter 32 does not reach a predetermined number (NO at step #62), control returns to step #45.

When the count value of error line counter 32 reaches a predetermined number, the reception data of that page is abandoned (step #63). Then, waiting is conducted for the reception of a subsequent procedure signal such as "MPS", "EOP", "EOM", etc. (step #64). Then, a response signal "RTN" indicating reception failure is sent out (step #65), whereby recording portion power supply 45 is turned off. Supply of power to recording portion 5 is suppressed (step #66) to terminate the reception process.

When the check of the reception data of one page is completed and confirmation is made of proper reception, the result of step #45 is NO. Waiting is conducted for the reception of a subsequent procedure signal (step #71), whereby the counted values of recording page counter 33 and line counter 31 are stored in controller 40 (step #72). Recording portion power supply 45 is turned on to commence the supply of power to recording portion 5 (step #73). A response signal "MCF" indicating a proper reception is sent out (step #74). If there is a succeeding page to be received (YES at step #75), receiving page counter 35 is incremented by 1

(step #77). Control proceeds to step #42 to continue the reception process of the succeeding page.

After the process of the received last page is completed (NO at step #75), the count value of receiving page counter 35 is stored in controller 40 (step #76) to terminate the reception process.

Figure 8:
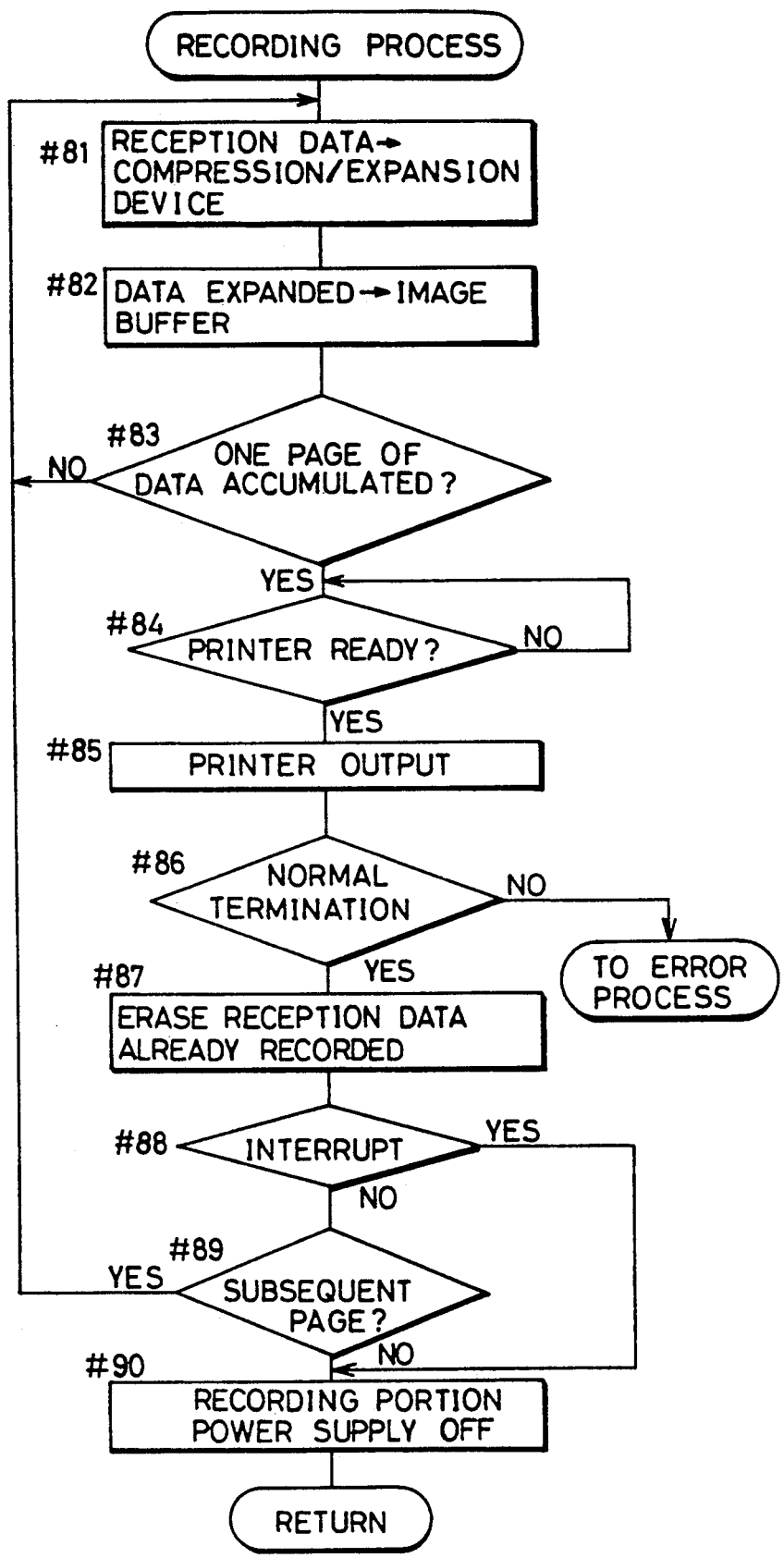
FIG. 8 is a flow chart showing the specific contents of the routine of the storing process of FIG. 4.

FIG. 8 is a flow chart showing the specific contents of the recording process of step #15.

The reception data (compressed data) stored in compressed data memory 37 is sent to compression/expansion device 36, where expansion process is carried out (step #81). The image data obtained by expansion is stored in image buffer 34 (step #82).

When image data of 1 page is accumulated (YES at step #83), waiting is conducted for recording portion 5 to attain a ready state (step #84). Then, the contents of image buffer 34 is sent to recording portion 5 to carry out printing (step #85).

When printing is carried out properly (YES at step #86), the corresponding reception data is erased from compressed data memory 37 (step #87).

When there is no interruption (NO at step #88), and there is reception data of a subsequent page (YES at step #89), the control proceeds to step #81 to continue the recording process of the subsequent page. If there is no reception data of a subsequent page (NO at step #89), supply of power to recording portion 5 is suppressed (step #90) to terminate the recording process.

When there is interrupt (YES at step #88), supply of power to recording portion 5 is immediately suppressed (step #90).

If error such as jamming occurs at step #86, the control proceeds to an error process not shown.

In the above described flow charts of a FIGS. 7A and 7B, checking of error lines are carried out during the reception of data of 1 page, i.e. in parallel with data reception. However, checking of an error line may be carried out after data of one page is accumulated, as will be described hereinafter.

Figure 9A:
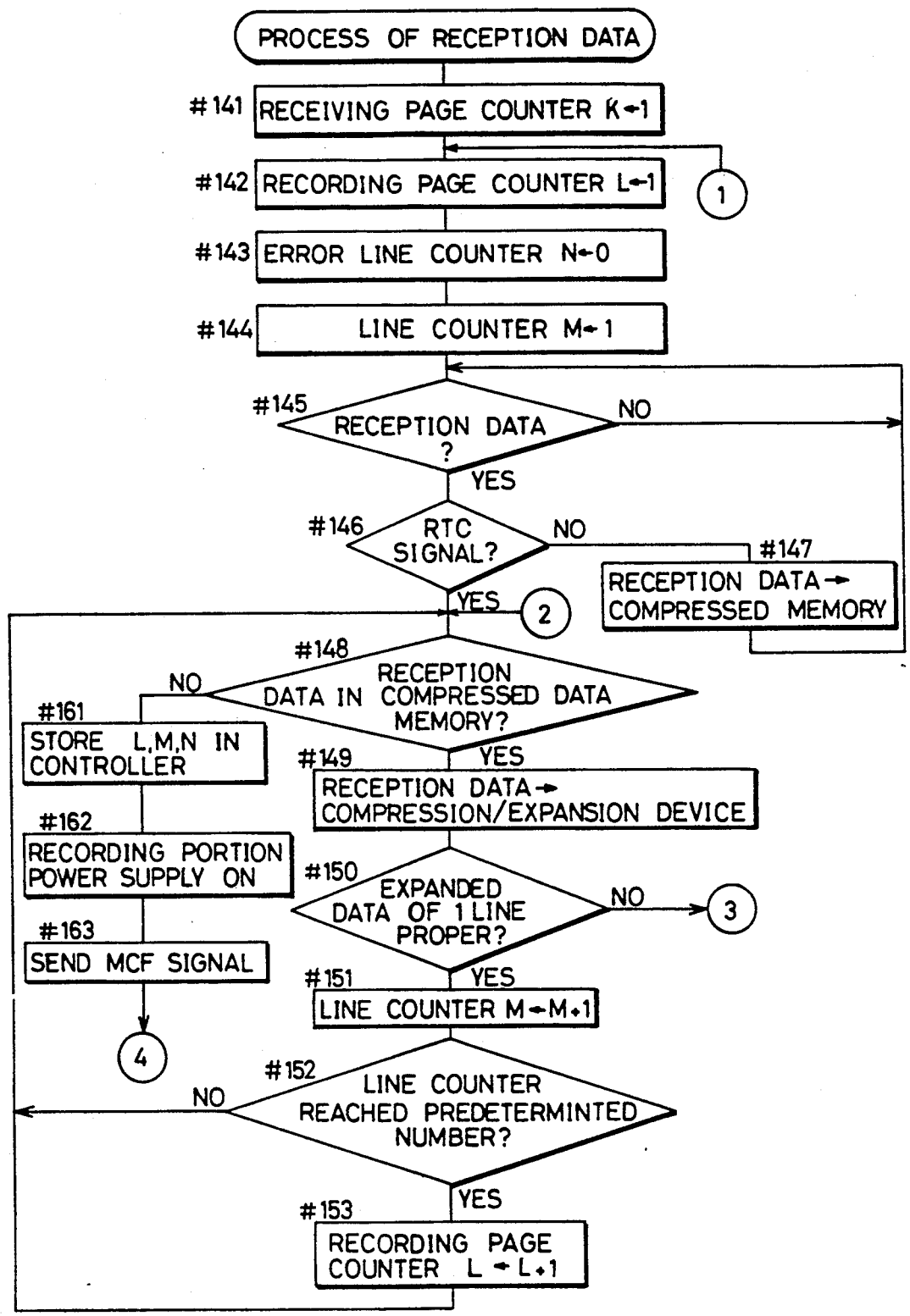
FIGS. 9A and 9B are flow charts showing the specific contents according to another embodiment of the routine of the process of reception data of FIG. 4.
Figure 9B:
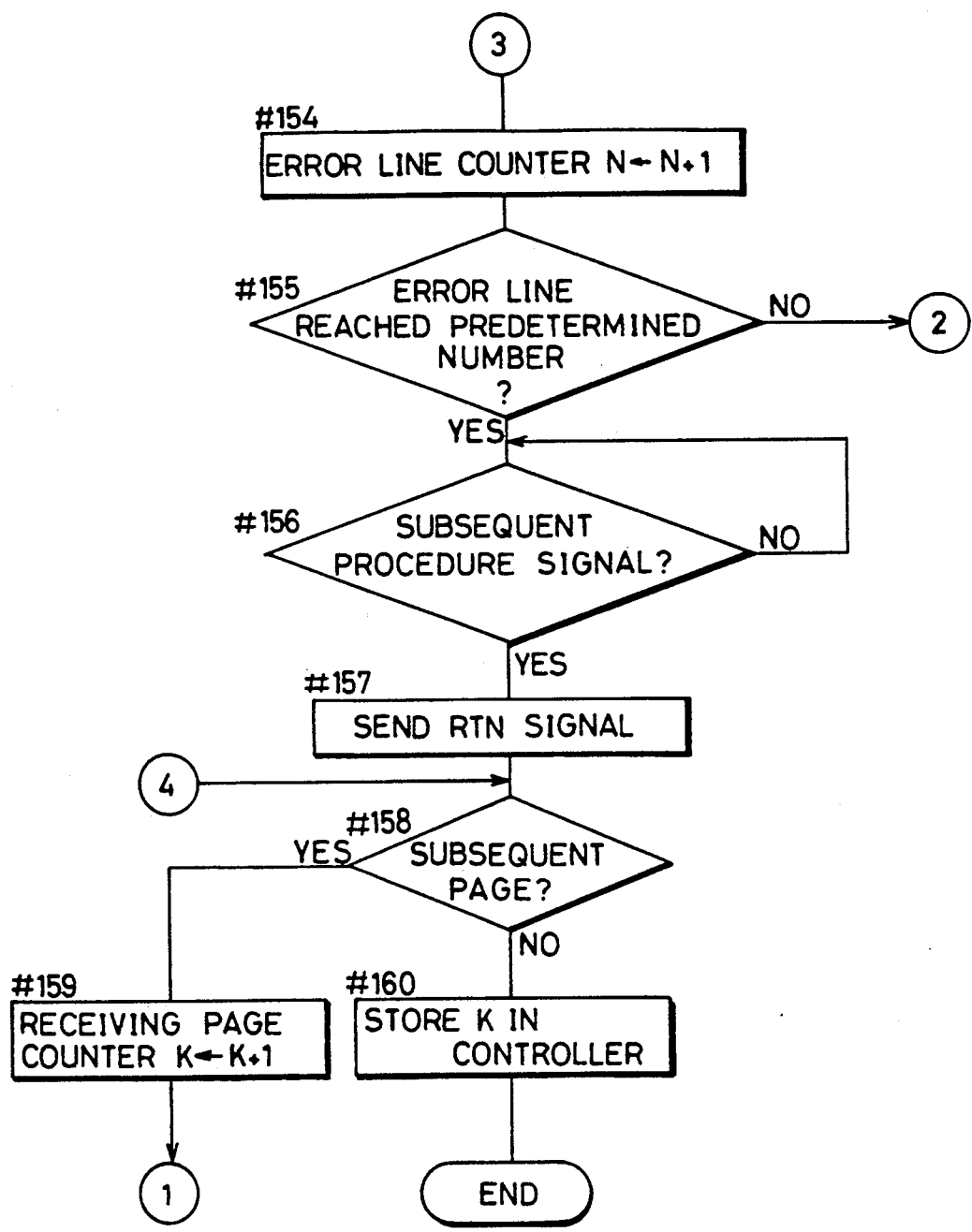

FIG. 9 is a flow chart showing another embodiment of the reception data process of steps #14 of FIG. 4.

As shown in this flow chart, error checking is carried out for every 1 page of reception data, whereby a "RTN" signal is transmitted with respect to the page not received properly.

First, initialization of receiving page counter 35, recording page counter 33, error line counter 32, and line counter 31 is carried out (steps #141-144).

When there is reception data (YES at step #145), determination is made whether the reception data is "RTC" or not (step #146). Until a "RTC" signal is received (until the result of step #146 is YES), reception data is stored in compressed data memory 37 (step #147). "RTC" is a signal indicating the switching of high speed modem to a low speed modem, sent at the end of one page of image data.

On receiving the RTC signal, determination is made whether there is reception data in compressed data memory 37 (step #148). Since presence of reception data of the same one page (one page of the transmitting side) is made at step #148, the determination is NO at this step when the process of one page is completed.

When there is reception data in compressed data memory 37, the reception data is provided to compression/expansion device 36 where expansion process is carried out (step #149).

At the same time of this expansion process, the number of dots for every one line of the expanded data is checked by controller 40 to determine whether it is a line error or not (step #150).

If the line is proper (YES at step #150), line counter 31 is incremented (step #151).

The process of step #148 et seq is repeated until the count value of line counter 31 becomes a predetermined value. When the count value attains a predetermined value (YES at step #152), recording page counter 33 is incremented (step #153), whereby control returns to step #148. Step #148 et seq is repeated until the checking of reception data of that one page is completed.

When determination is made that there is an error line at step #150, error line counter 32 is incremented (step #154). If the count value of error line counter 32 does not reach the predetermined number (NO at step #155), the control proceeds to step #148.

If the count value of error line counter 32 reaches the predetermined value, waiting is conducted for an incoming subsequent procedure signal such as "MPS", "EOP" and "EOM" (step #156), followed by the transmission of a response signal of "RTN" indicating that the reception is not proper (step #157). When there is a subsequent page to be received (YES at step #158), receiving page counter 35 is incremented (step #159). The control proceeds to step #142 to continue the receiving process of the subsequent page.

When there is no subsequent page to be received, (NO at step #158), the count value of receiving page counter 35 is stored at controller (step #160) to terminate the receiving process.

When reception data of one page is checked and confirmation made of proper reception, the result of step #148 is NO. The count values of recording page counter 33, line counter 31 and error line counter 32 are stored in controller 40 (step #161). Recording portion power supply 45 is turned on to commence supply of power to recording portion 5 (step #162). Then a response signal of "MCF" indicating proper reception is transmitted (step #163). Then, the control proceeds to step #158.

Regarding step #88 in the flow chart of the above described FIG. 8, the control may be implemented to proceed to step #16 in the flow chart of FIG. 4 after recording portion power supply 45 is turned off in the case of transmission interrupt, and to proceed to step #13 in the flow chart of FIG. 4 in the case of reception interrupt.

According to the above described embodiment, the presence of an error is checked upon receiving data at memory reception, whereby a "RTN" signal is transmitted as a response signal with respect to the page determined as transmission error. The sending party (transmitting side) receiving this response signal may have this transmission error displayed on an operation panel or printed in a management report, whereby the operator of the transmission side can be made aware of transmission error. In response to this transmission error, various measures can be taken such as retransmitting the error page, or leave that error page and transmit a subsequent page, or cease the transmission operation as error.

Although reception data demodulated by modulation/demodulation device 38 is directly stored in compressed data memory 37 in the above embodiment, the data expanded by compression/expansion device 36 for error checking may be compressed by another compression method, for example by a compression method with a higher compression efficiency, and then be stored in compressed data memory 37.

In the above described embodiments, supply and suppress of power to recording portion 5 is controlled by the on/off of AC input to recording portion power supply 45. However, AC input to recording portion power supply 45 may be provided all times, and the output from decoding power supply 45 may be turned on/off instead. Although all the necessary power to recording portion 5 is supplied or not supplied in the above-described embodiment, the facsimile apparatus of the present invention may be implemented to suppress only a portion of the required supply power, for example, suppress only the power to the heater used for the fixing process which particularly consumes much power.

Various modifications in the implementation, the structure, the configuration, the dimension, the circuit, the capacity, the contents of the flow charts, other than those described in the above embodiments, are possible for recording portion 5, reading portion 6, power supply controller 41, communication controller 30, and other components of facsimile apparatus 1.

According to the present invention, presence of error in reception data can be checked in a facsimile apparatus capable of memory reception to allow some measures to be taken at the sending side.

This improves reliability of communication in a facsimile apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile apparatus comprising:
reception means for receiving compressed image data transmitted from another facsimile apparatus,
storing means for storing a plurality of pages of compressed image data received by said reception means,
first expanding means for expanding said stored compressed image data, after said storing means completes storage of said plurality of pages of compressed image data,
image formation means for forming an image on a paper sheet according to the image data expanded by said first expanding means,
second expanding means for expanding said compressed image data before expansion by said first expanding means, and
detecting means for detecting whether or not said image data is received properly on the basis of image data expanded by said second expanding means.

2. The facsimile apparatus according to claim 1, wherein said detecting means comprises
dot counting means for counting the number of pixels included in the image data expanded by said second expanding means, and
comparing means for comparing said number of counted pixels with a predetermined value.

3. The facsimile apparatus according to claim 1, further comprising transmission means for transmitting a signal indicating the detected result of said detecting means to said another facsimile apparatus.

4. The facsimile apparatus according to claim 3, wherein
said detecting means comprises line counter means for counting the number of effective lines of image data expanded by said second expanding means,
said facsimile apparatus transmits a signal indicating that the reception of said image data is not proper to said another facsimile apparatus when said counted number of effective lines do not reach a predetermined value.

5. A facsimile apparatus comprising:
reception means for receiving a code data transmitted by another facsimile apparatus,
storing means for storing said code data received by said reception means,
predecoding means for decoding the code data received by said reception means sequentially into image data,
detecting means for detecting presence of reception error by checking image data decoded by said predecoding means,
transmission means for transmitting a signal indicating the detected result of said detecting means to said another facsimile apparatus,
re-decoding means for decoding again said code data stored in said storing means into image data, after transmission of said signal by said transmission means, and
image formation means for forming an image on a paper sheet according to the image data decoded by said re-decoding means.

6. The facsimile apparatus according to claim 5, wherein
said code data corresponds to a plurality of pages of original image,
said transmission means transmits said signal every time said reception means receives one page of image data,
said re-decoding means decodes said code data into image data after all of said plurality of pages of code data are received.

7. A facsimile apparatus comprising:
reception means for receiving compressed image data transmitted from another facsimile apparatus,
storing means for storing a plurality of pages of compressed image data received by said reception means,
first expanding means for expanding said stored compressed image data after said storing means completes storage of said plurality of pages of compressed image data,
image formation means for forming an image on a paper sheet according to the image data expanded by said first expanding means,
second expanding means for expanding said compressed image data in parallel with the storing operation of said compressed image data by said storing means, and
detecting means for detecting whether said image data is received properly or not according to the image data expanded by said second expanding means.

8. The facsimile apparatus according to claim 7, further comprising transmission means for transmitting the detected result of said detecting means to said another facsimile apparatus.

9. The facsimile apparatus according to claim 7, wherein said reception means suppresses reception of said image data when detection is made by said detecting means that reception of said image data is not proper.

10. The facsimile apparatus according to claim 7, further comprising compression means for recompressing image data expanded by said second expanding means, wherein said storing means stores image data compressed by said recompression means.

* * * * *